United States Patent
Ishimaru

(10) Patent No.: US 9,609,301 B2
(45) Date of Patent: Mar. 28, 2017

(54) ELECTRONIC APPARATUS AND CONTROL METHOD THEREFOR

(71) Applicant: CANON KABUSHIKI KAISHA, Tokyo (JP)

(72) Inventor: Satoshi Ishimaru, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 269 days.

(21) Appl. No.: 14/337,367

(22) Filed: Jul. 22, 2014

(65) Prior Publication Data

US 2015/0036998 A1 Feb. 5, 2015

(30) Foreign Application Priority Data

Jul. 30, 2013 (JP) ................ 2013-158272

(51) Int. Cl.
*H04N 5/77* (2006.01)
*H04N 9/82* (2006.01)
*H04N 5/232* (2006.01)

(52) U.S. Cl.
CPC .......... *H04N 9/8205* (2013.01); *H04N 5/772* (2013.01); *H04N 5/23241* (2013.01); *H04N 5/23293* (2013.01)

(58) Field of Classification Search
CPC .................................................. H04N 5/225
USPC ....................................................... 386/228
See application file for complete search history.

(56) References Cited

U.S. PATENT DOCUMENTS

| 5,598,275 | A | * | 1/1997 | Nagasawa | ............ | G11B 27/024 |
| | | | | | | 348/239 |
| 2004/0141085 | A1 | * | 7/2004 | Nickel | ................ | H04N 1/0044 |
| | | | | | | 348/333.11 |
| 2010/0302408 | A1 | * | 12/2010 | Ito | ........................ | H04N 1/0035 |
| | | | | | | 348/231.99 |
| 2011/0279691 | A1 | * | 11/2011 | Ishii | ................... | H04N 1/00323 |
| | | | | | | 348/207.99 |

FOREIGN PATENT DOCUMENTS

| JP | 2004-208096 A | 7/2004 |
| JP | 2011-197467 A | 10/2011 |

* cited by examiner

*Primary Examiner* — Hung Dang
*Assistant Examiner* — Girumsew Wendmagegn
(74) *Attorney, Agent, or Firm* — Carter, DeLuca, Farrell & Schmidt, LLP

(57) ABSTRACT

An electronic apparatus including an imaging unit detects the attitude of the electronic apparatus, and performs specific processing for an image captured by the imaging unit based on the detected attitude. When performing interval recording in which an image captured by the imaging unit is recorded at an interval based on a predetermined setting interval, the electronic apparatus performs, for images recorded in the second and subsequent operations, the specific processing based on information of an attitude used to perform the first image recording operation.

28 Claims, 11 Drawing Sheets

ELECTRONIC APPARATUS AND CONTROL METHOD THEREFOR

BACKGROUND OF THE INVENTION

Field of the Invention

The present invention relates to an electronic apparatus capable of performing interval recording in which shooting is repeatedly performed at a given time interval, and a control method for the electronic apparatus.

Description of the Related Art

As a shooting method for a video camera, there are provided, for example, a shooting method in which the user performs operations for shooting, such as a recording start operation and recording stop operation while holding a video camera by hands, and an interval recording method in which recording of a given unit time is repeated at a given time interval. Japanese Patent Laid-Open No. 2011-197467 proposes a technique of performing shooting in interval shooting only if the optical axis of a photographing lens falls within the ranges of the photography permitting inclination and photography permitting direction. Furthermore, Japanese Patent Laid-Open No. 2004-208096 proposes a digital camera which displays a framing assist composition frame at the time of shooting at a portrait position, and records, when shooting is performed in that state, an image rotated by 90° or 270°.

Some imaging apparatuses have an automatic rotation function of detecting the gravity direction at the time of shooting, and rotating an image. With this automatic rotation function, regardless of whether shooting is performed by setting an imaging apparatus in the landscape or portrait position, or even if shooting is performed by turning an imaging apparatus upside down, an image is recorded so that the gravity direction is the downward direction. Therefore, when playing back an image on TV, the user can observe an erect image regardless of the orientation of the imaging apparatus at the time of shooting.

If, however, the above-described automatic rotation function operates in each recording operation of interval shooting, it may be impossible to perform shooting according to the user's intention. For example, even if the user attempts to perform shooting by rotating an image by performing shooting by rotating a camera in interval shooting, the automatic rotation function causes an erect image to be unwantedly recorded.

SUMMARY OF THE INVENTION

According to the present invention, there are provided an electronic apparatus capable of maintaining the consistency between the orientations of a series of images recorded in interval recording, and a control method for the electronic apparatus.

According to one aspect of the present invention, there is provided an electronic apparatus including an imaging unit, comprising: an attitude detection unit configured to detect an attitude of the electronic apparatus; a processing unit configured to perform specific processing for an image captured by the imaging unit based on the attitude detected by the attitude detection unit; a recording control unit configured to perform interval recording in which an image captured by the imaging unit is recorded at an interval based on a predetermined setting interval; and a control unit configured to control the processing unit to perform, for images recorded in a second operation and subsequent operations, the specific processing based on information of an attitude used to perform a first image recording operation at the time of the interval recording.

Also, according to one aspect of the present invention, there is provided an electronic apparatus including an imaging unit, comprising: an attitude detection unit configured to detect an attitude of the electronic apparatus; a recording processing unit configured to perform specific processing for an image captured by the imaging unit based on the attitude detected by the attitude detection unit, and associate information indicating the attitude used in the specific processing with the image; a recording control unit configured to perform interval recording in which an image recording operation is executed by the recording processing unit at an interval based on a predetermined setting interval; a combining unit configured to combine a plurality of images recorded by the interval recording into one file after end of the interval recording; and a control unit configured to control the combining unit to perform the specific processing based on information indicating an attitude associated with each of the plurality of images.

Also, according to one aspect of the present invention, there is provided a control method for an electronic apparatus including an imaging unit, comprising: an attitude detection step of detecting an attitude of the electronic apparatus; a processing step of performing specific processing for an image captured by the imaging unit based on the attitude detected in the attitude detection step; a recording control step of performing interval recording in which an image captured by the imaging unit is recorded at an interval based on a predetermined setting interval; and a control step of controlling to perform, in the processing step, for images recorded in a second operation and subsequent operations, the specific processing based on information of an attitude used to perform a first image recording operation at the time of the interval recording.

Furthermore, according to one aspect of the present invention, there is provided a control method for an electronic apparatus including an imaging unit, comprising: an attitude detection step of detecting an attitude of the electronic apparatus; a recording processing step of performing specific processing for an image captured by the imaging unit based on the attitude detected in the attitude detection step, and associating information indicating the attitude used in the specific processing with the image; a recording control step of performing interval recording in which an image recording operation is executed at an interval based on a predetermined setting interval in the recording processing step; a combining step of combining a plurality of images recorded by the interval recording into one file after end of the interval recording; and a control step of controlling to perform the specific processing based on information indicating an attitude associated with each of the plurality of images in the combining step.

Further features of the present invention will become apparent from the following description of exemplary embodiments with reference to the attached drawings.

DESCRIPTION OF THE EMBODIMENTS

Embodiments of the present invention will be described below with reference to the accompanying drawings.

First Embodiment

Figure 1:
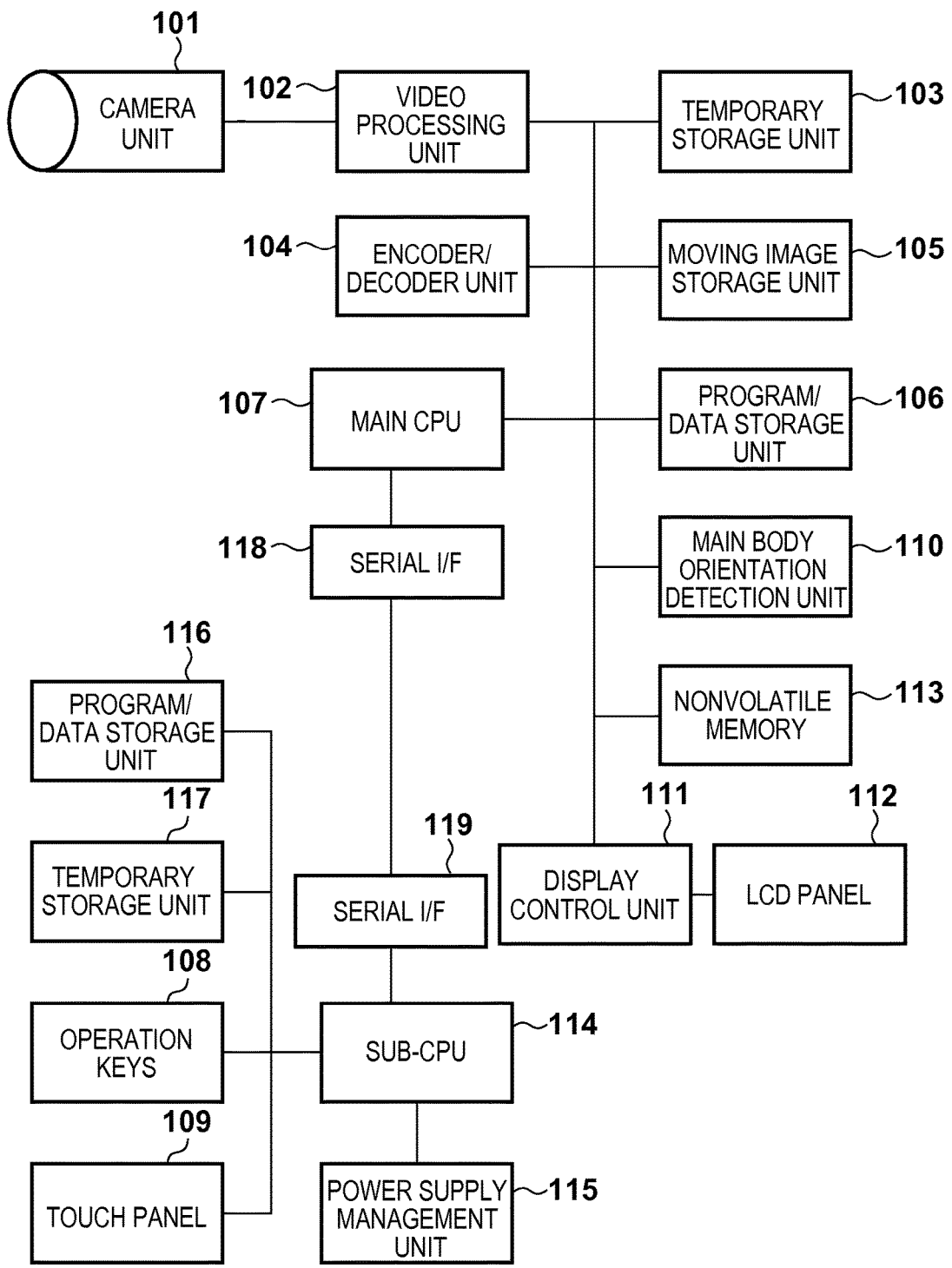
FIG. 1 is a block diagram showing an example of the arrangement of an imaging apparatus according to an embodiment.

FIG. 1 is a block diagram showing an example of the arrangement of an imaging apparatus according to the first embodiment. In this embodiment, a digital video camera (to be simply referred to as a camera hereinafter) including a camera unit 101 serving as an imaging unit will be exemplified as an example of the imaging apparatus.

The camera includes a main CPU 107 and a sub-CPU 114 either of which serves as an arithmetic device for controlling the operation of the overall camera. The main CPU 107 loads programs from a program/data storage unit 106, and executes various kinds of processing. The sub-CPU 114 loads programs from a program/data storage unit 116, and executes various kinds of processing. The main CPU 107 and the sub-CPU 114 control the overall camera according to the loaded programs, respectively. Each loaded program has a function of causing the main CPU 107 or sub-CPU 114 to execute a plurality of tasks in parallel. More specifically, a camera control task, a recorder control task, and a display control task operate under the control of the main CPU 107, and a mode control task and a power supply control task operate under the control of the sub-CPU 114. The main CPU 107 and sub-CPU 114 exchange data via serial I/Fs 118 and 119 by serial communication.

The camera unit 101 includes a mechanism for inputting an analog video signal obtained by imaging to a moving image recording apparatus. More specifically, the camera unit 101 includes a lens for forming an image of light from an object, an image sensor for photoelectrically converting an object image formed by the lens, and a circuit for driving the image sensor. A video processing unit 102 converts the analog video signal input from the camera unit 101 into digital moving image data, and performs correction based on predetermined image processing such as noise removal. The camera control task executed by the main CPU 107 controls the operation of the camera unit 101 and video processing unit 102. Note that the camera control task functions as a recording control unit for performing interval recording in which an image captured by the camera unit 101 is recorded at an interval based on a predetermined setting interval. Under the control of the main CPU 107, by using the attitude of the imaging apparatus (camera main body) detected by a main body orientation detection unit 110 (to be described later), the video processing unit 102 performs specific processing such as image rotation for an image captured by the camera unit 101.

An encoder/decoder unit 104 encodes moving image data from the video processing unit 102. The moving image data encoded by the encoder/decoder unit 104 is temporarily stored in a temporary storage unit 103 formed by, for example, a RAM, and stored in a moving image storage unit 105 together with accompanying management data. At the time of playing back a moving image, the encoded moving image data (image data) read out from the moving image storage unit 105 is provided to the encoder/decoder unit 104 via the temporary storage unit 103, and is decoded. The decoded moving image data is rasterized in a moving image frame buffer (not shown) of the temporary storage unit 103. The recorder control task executed by the main CPU 107 executes the storage control of the encoder/decoder unit 104 and moving image storage unit 105.

The recorder control task controls the operation of interval recording of automatically recording a moving image at an interval based on a set setting interval, for example, at a predetermined time interval. The recording time of the interval recording is set to several frames in a video signal method, and the user can set a repetition time in minutes/hours. In the interval recording, an image captured by the camera unit 101 is recorded at an interval based on a predetermined setting interval. Furthermore, the encoder/decoder unit 104 can combine a plurality of moving image scenes recorded by the interval recording to obtain one moving image scene.

Management data read out from the moving image storage unit 105 is used to generate OSD (On Screen Display) data, that is, data for a GUI (Graphical User Interface) or display of characters superimposed on a shot image/playback image. The generated OSD data is drawn in an OSD frame buffer (not shown) of the temporary storage unit 103. A display control unit 111 superimposes contents of the moving image frame buffer and those of the OSD frame buffer, and displays them on an LCD panel 112. Operation keys 108 and a touch panel 109 each serve as an operation unit for receiving an operation instruction from the user.

The main body orientation detection unit 110 serves as an attitude detection unit for detecting the orientation (attitude) of the camera main body. The main body orientation detection unit 110 is formed from an acceleration sensor or gyro sensor which can detect the gravity direction. The main body orientation detection unit 110 can detect whether the user uses the apparatus upside down (an upside-down attitude to be described later with reference to FIG. 2C) or uses the apparatus in a normal orientation (a normal attitude to be described later with reference to FIG. 2B).

A nonvolatile memory 113 is a memory for saving data. The nonvolatile memory may be an SRAM, EEPROM, or FLASH-ROM. A power supply management unit 115 manages the power supply of the overall video camera. The power supply management unit 115 controls the power supply according to a change in the internal state managed by the mode control task executed by the sub-CPU 114. For example, if the imaging apparatus is in an activation state, the power supply management unit 115 supplies power to the main CPU 107. If the imaging apparatus is in a power-off state or power saving mode state, the power supply management unit 115 shuts off power supply to the main CPU 107.

Figure 2A:
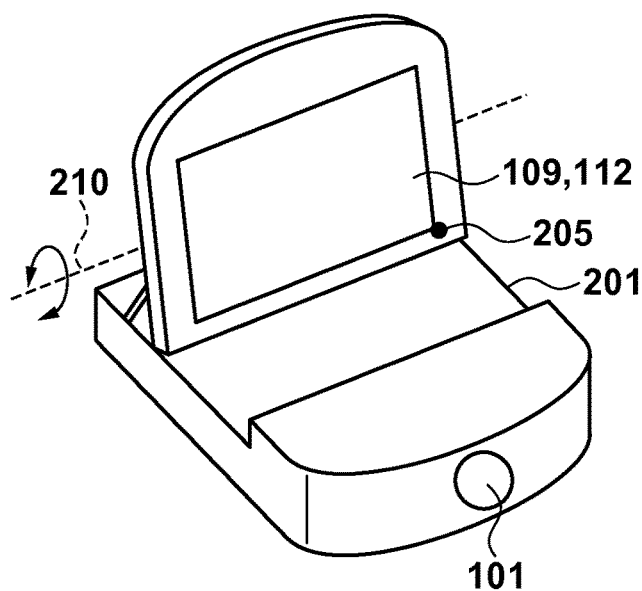
FIGS. 2A to 2C are views each showing an example of the outer appearance of the imaging apparatus according to the embodiment.
Figure 2B:
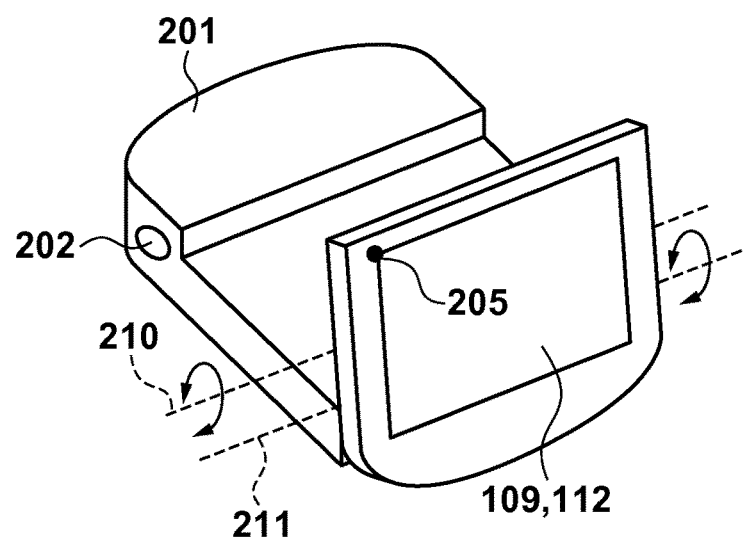
Figure 2C:
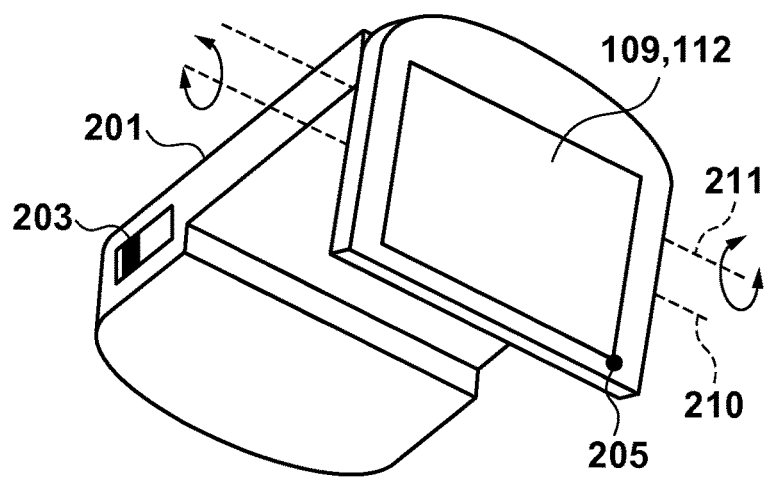

FIGS. 2A to 2C each show an example of the outer appearance of the digital video camera. FIG. 2A is a perspective view showing the camera held in the normal attitude while setting the LCD panel 112 including the touch panel 109 at a facing position when viewed from the front. FIG. 2B is a perspective view showing the camera held in the normal attitude while setting the LCD panel 112 including the touch panel 109 to face backward when viewed from the back. The LCD panel 112 shown in FIG. 2B is rotated about an axis 210 by about 180° with respect to the facing position shown in FIG. 2A. FIG. 2C is a perspective view showing the camera held upside down (in the upside-down attitude) with respect to the normal attitude while setting the LCD panel 112 including the touch panel 109 to face backward when viewed from the back.

The display unit including the LCD panel 112 is connected to a main body unit 201 including the camera unit 101 so as to be pivotable about an axis 211 via a hinge (not shown). The display unit can rotate about the axis 211 by about 90°, and can move to a closed position with respect to the main body unit (a position where the back surface of the LCD panel 112 faces the main body unit 201) and an open position (the position shown in FIGS. 2B and 2C). The display unit is also attached to be rotatable about the axis 210 by about 180°. By rotating about the axis 210, the display unit can move to the facing position where the display surface of the LCD panel 112 faces in the same direction (the object side) as that of the lens unit of the camera unit 101, and a face-back position where the display surface of the LCD panel 112 faces in a direction opposite to the object side (FIGS. 2A and 2B).

Origins 205 respectively shown in FIGS. 2A to 2C indicate the same position on the LCD panel 112. The origin 205 at the upper left position in the normal attitude while setting the display unit to face backward as shown in FIG. 2B is set at the lower right position when the display unit faces forward in the same normal attitude (FIG. 2A). That is, in the states shown in FIGS. 2A and 2B, it is found that the LCD panel 112 is turned upside down and left to right from the viewpoint of the user (the LCD panel 112 is rotated by 180°). Furthermore, the origin 205 at the upper left position in the normal attitude while setting the display unit to face backward as shown in FIG. 2B is set at the lower right position when the main body unit 201 is held in the upside-down attitude at the same face-back position (FIG. 2C). That is, also in the states shown in FIGS. 2B and 2C, the LCD panel 112 is turned upside down and left to right from the viewpoint of the user (the LCD panel 112 is rotated by 180°).

As shown in FIG. 2B, as one of the operation keys 108, a shutter button 202 is attached to the main body unit 201. The user can record a still image at an arbitrary timing by pressing the shutter button 202. Furthermore, as shown in FIG. 2C, as one of the operation keys 108, a lens cover slide switch 203 is attached to the main body unit 201. The user can open/close the lens cover of the camera unit 101 by moving the lens cover slide switch 203.

Note that the touch panel 109 and the LCD panel 112 can be integrally formed. For example, the light transmittance of the touch panel 109 is set not to interfere with display of the LCD panel 112, and the touch panel 109 is attached on the upper layer of the display surface of the LCD panel 112. Input coordinates on the touch panel 109 are set to correspond to display coordinates on the LCD panel 112. This can configure a GUI (Graphical User Interface) to look as if the user could directly operate a screen displayed on the LCD panel 112. The sub-CPU 114 can detect the following operations and states on the touch panel 109:
touching the touch panel 109 with a finger or pen (to be referred to as a touch-down hereinafter);
a state in which the touch panel 109 remains touched with a finger or pen (to be referred to as a touch-on hereinafter);
moving a finger or pen keeping touched the touch panel 109 (to be referred to as a touch-move hereinafter);
releasing a finger or pen from the touch panel 109 (to be referred to as a touch-up hereinafter); and
a state in which nothing touches the touch panel 109 (to be referred to as a touch-off hereinafter).

The sub-CPU 114 notifies the main CPU 107 of these operations/states and position coordinates at which the finger or pen touches the touch panel 109 via an internal bus. Based on the received information, the main CPU 107 determines what kind of operation has been done on the touch panel 109. As for a touch-move, the moving direction of the finger or pen that moves on the touch panel 109 is detected as a moving amount for each of the vertical component and the horizontal component on the touch panel 109 based on a change in the position coordinates. Assume that when a touch-up occurs on the touch panel 109 after a touch-down and a predetermined touch-move, a stroke is drawn.

An operation of quickly drawing a stroke will be called a flick. The flick is an operation of quickly moving a finger touched the touch panel 109 by a given distance and then releasing it. In other words, the flick is an operation of quickly tracing the surface of the touch panel 109 with a finger like flipping. Upon detecting a touch-move for a predetermined distance or more at a predetermined speed or more and then detecting a touch-up, the main CPU 107 can determine that a flick has been performed. Upon detecting a touch-move for a predetermined distance or more at a speed lower than a predetermined speed, the main CPU 107 determines that a drag has been performed. As the touch panel 109, any one of various types of touch panels such as a resistance film type, an electric capacity type, a surface acoustic wave type, an infrared-ray type, an electromagnetic induction type, an image recognition type, and a photosensor type may be used.

The mode control task executed by the sub-CPU 114 performs transition of the operation state of the overall video camera in response to an instruction from the operation unit (operation keys 108 and touch panel 109) or a change in the internal state managed by the mode control task itself. The sub-CPU 114, therefore, notifies each task executed by the main CPU 107 of an event via the serial I/Fs 118 and 119.

Figure 3A:
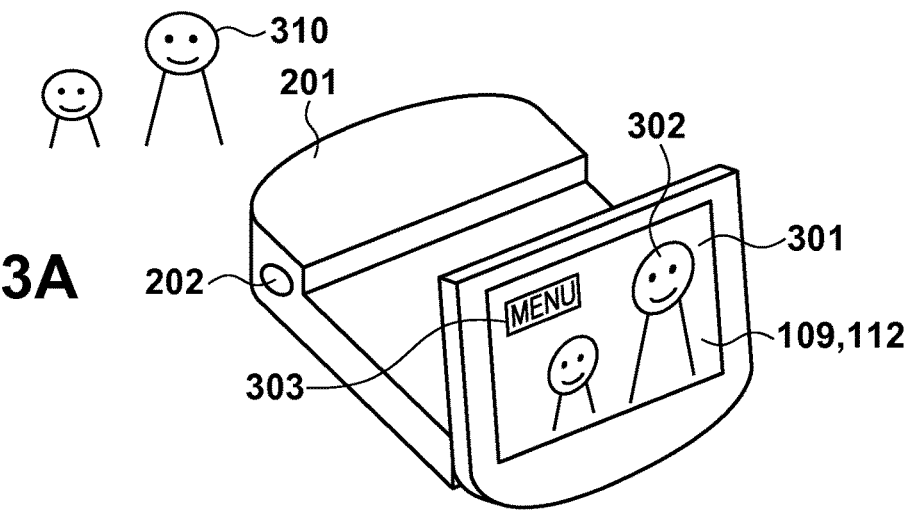
FIGS. 3A to 3C are views each showing an display example and the outer appearance of the imaging apparatus according to the embodiment.
Figure 3B:
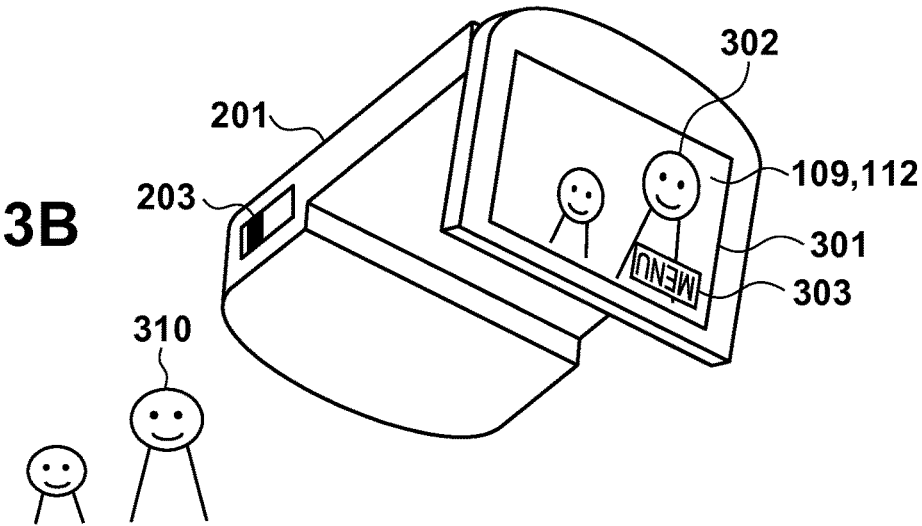
Figure 3C:
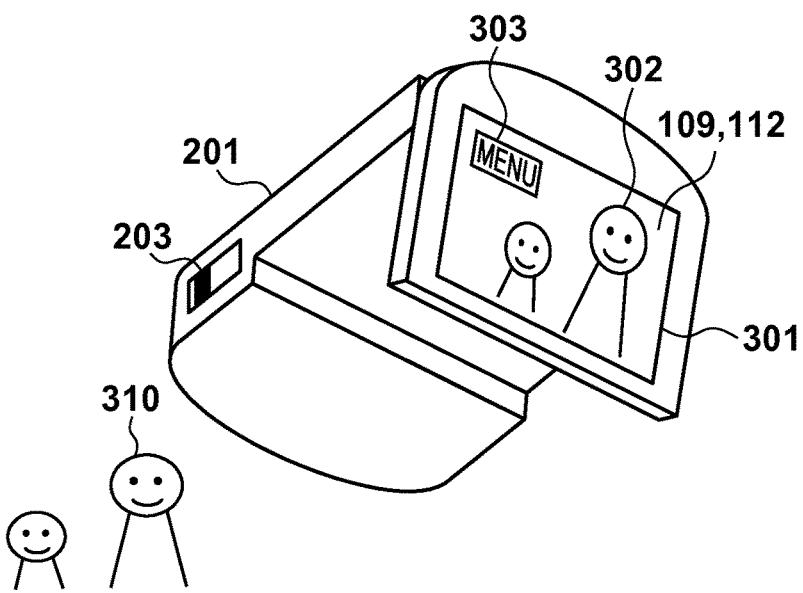

FIGS. 3A to 3C are views each showing an example of a screen displayed on the LCD panel 112 in the specific orientation of the main body unit 201 in a shooting state. FIG. 3A shows an example of a screen displayed on the LCD panel 112 in a normal shooting mode when the orientation of the main body unit 201 corresponds to the normal attitude and the display unit is set at the face-back position. The LCD panel 112 displays an image 301 captured by the camera unit 101 on the full screen, and displays an object image 302 as an example of an image obtained by capturing an object 310. In the upper left portion of the screen, a menu button 303 as a touch button indicating that a touch operation is possible is displayed in OSD.

FIG. 3B shows an example of a screen displayed on the LCD panel 112 in the normal shooting mode when the automatic rotation function is OFF and the orientation of the main body unit 201 corresponds to the upside-down attitude. Note that the automatic rotation function is a function of implementing recording of an image desired by the user (an image as seen on the panel) while maintaining the operability in the normal orientation even in the upside-down attitude by rotating the orientation of the GUI and that of a recorded video in accordance with the orientation of the main body. Assume that the automatic rotation function is ON. In this case, if the orientation of the main body is turned upside down (inverted) with respect to the gravity, a shot image is rotated by 180° (this operation is equivalent to turning the image upside down and left to right), and recorded as an image file. When playing back the image while holding the main body in the normal attitude, or when playing back the image on an external device such as a television, the user can view the image by setting the orientation of an object in the image to a correct orientation with respect to the gravity direction. Note that the automatic rotation function can be switched on or off on a menu screen.

This automatic rotation function is implemented when the main body orientation detection unit 110 detects whether the main body is in an upside-down state (upside-down attitude) or not (normal attitude), and controls video processing according to each state. The video processing according to each state will be described later. The LCD panel 112 shown in FIG. 3B displays the image 301 captured by the camera unit 101 on the full screen, and displays the object image 302 as an example of an image obtained by capturing the object 310. In the lower right portion of the screen, the menu button 303 as a touch button indicating that a touch operation is possible is displayed upside down in OSD (that is, the counter-gravity direction corresponds to a direction toward the position below the menu button 303). Note that the reason why the menu button 303 is displayed upside down is because the automatic rotation function is OFF and the main body unit 201 is in the upside-sown attitude.

FIG. 3C shows an example of a screen displayed on the LCD panel 112 in the normal shooting mode when the automatic rotation function is ON and the orientation of the main body unit 201 is turned upside down (in the upside-down state). The LCD panel 112 shown in FIG. 3C displays the image 301 captured by the camera unit 101 on the full screen, and displays the object image 302 as an example of an image obtained by capturing the object 310. In the upper left portion of the screen, the menu button 303 as a touch button indicating that a touch operation is possible is displayed in OSD. Unlike the menu button shown in FIG. 3B, the menu button 303 is displayed in the correct direction from the viewpoint of the user (that is, the counter-gravity direction corresponds to a direction toward the position above the menu button 303) since the automatic rotation function is ON. As describe above, the captured image is rotated by 180° (this operation is equivalent to turning the image upside down and left to right), and is then recorded as an image file.

Figure 4A:
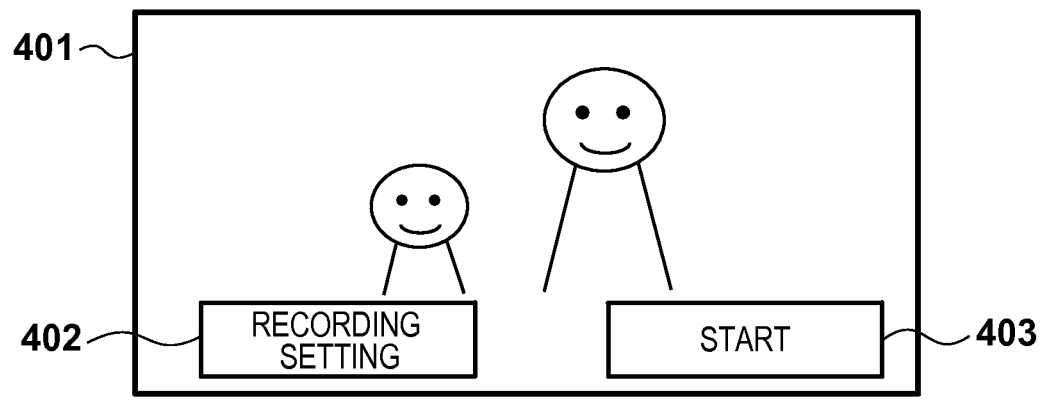
FIGS. 4A to 4C are views each showing a display example of the imaging apparatus.
Figure 4B:
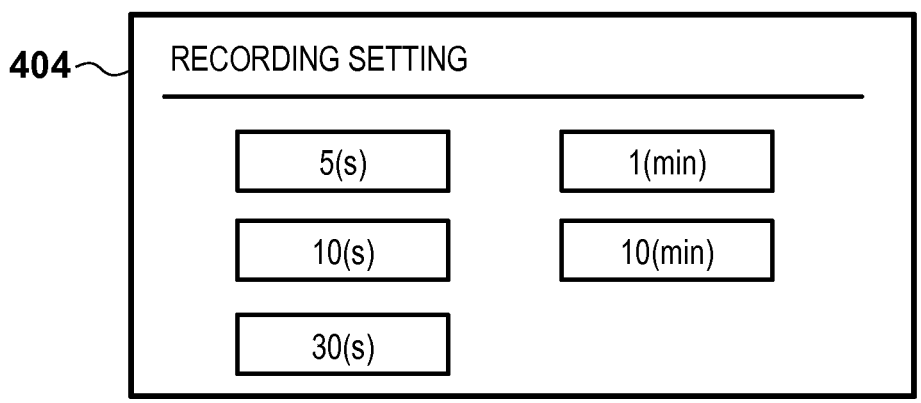
Figure 4C:
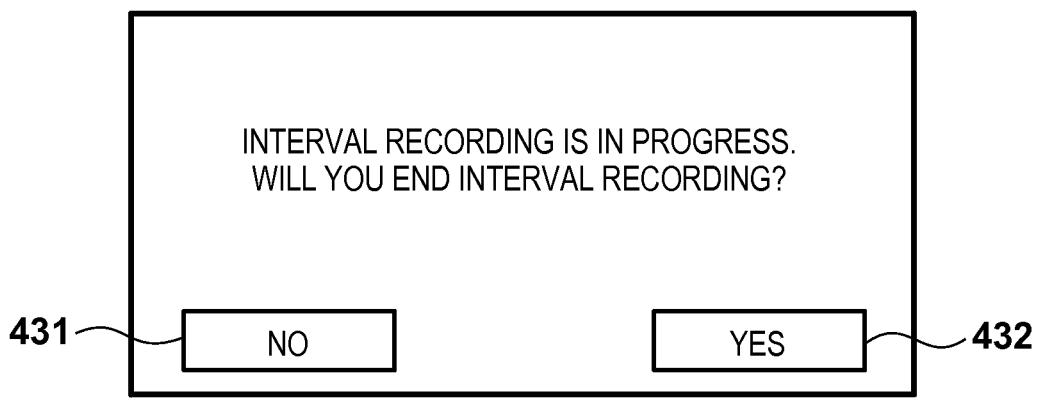

FIGS. 4A to 4C show various display examples of the imaging apparatus with respect to interval recording. A shooting standby screen 401 shown in FIG. 4A is a display example displayed on the LCD panel during shooting standby (before the start of interval recording) when the apparatus is set in an interval recording mode. A recording setting button 402 and START button 403 as touch buttons are superimposed and displayed on a camera through image (live view image). When the user touches the START button 403, interval recording of a moving image starts. On the other hand, when the user touches the recording setting button 402, transition to a recording setting screen 404 is performed.

FIG. 4B shows a display example of the recording setting screen 404. In the recording setting screen 404, the user can set the recording interval of interval recording. Options (touch buttons) of setting the recording interval of interval recording to 5 sec, 10 sec, 30 sec, 1 min, and 10 min are displayed. When the user touches one of the options, the recording interval of the touched option is set. The set recording interval is recorded in the nonvolatile memory 113.

FIG. 4C shows a display example of an interval recording end confirmation screen displayed when the user performs an end operation in the middle of interval recording. A button 431 indicating "NO" and a button 432 indicating "YES" are displayed as touch buttons. When the user touches the button 431, the interval recording operation continues. On the other hand, when the user touches the button 432, the interval recording operation ends.

Figure 5A:
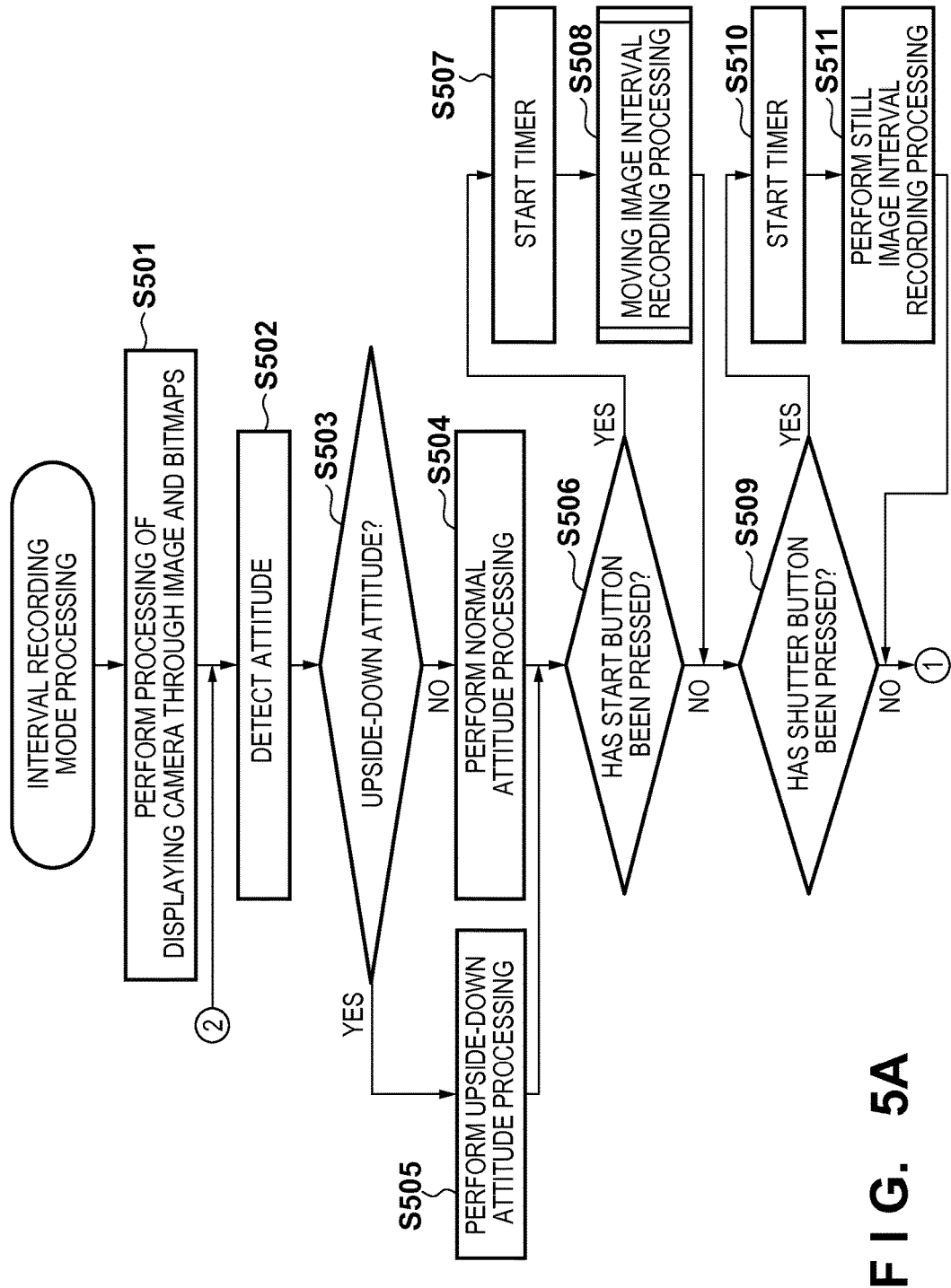
FIGS. 5A and 5B are flowcharts illustrating interval recording mode processing.
Figure 5B:
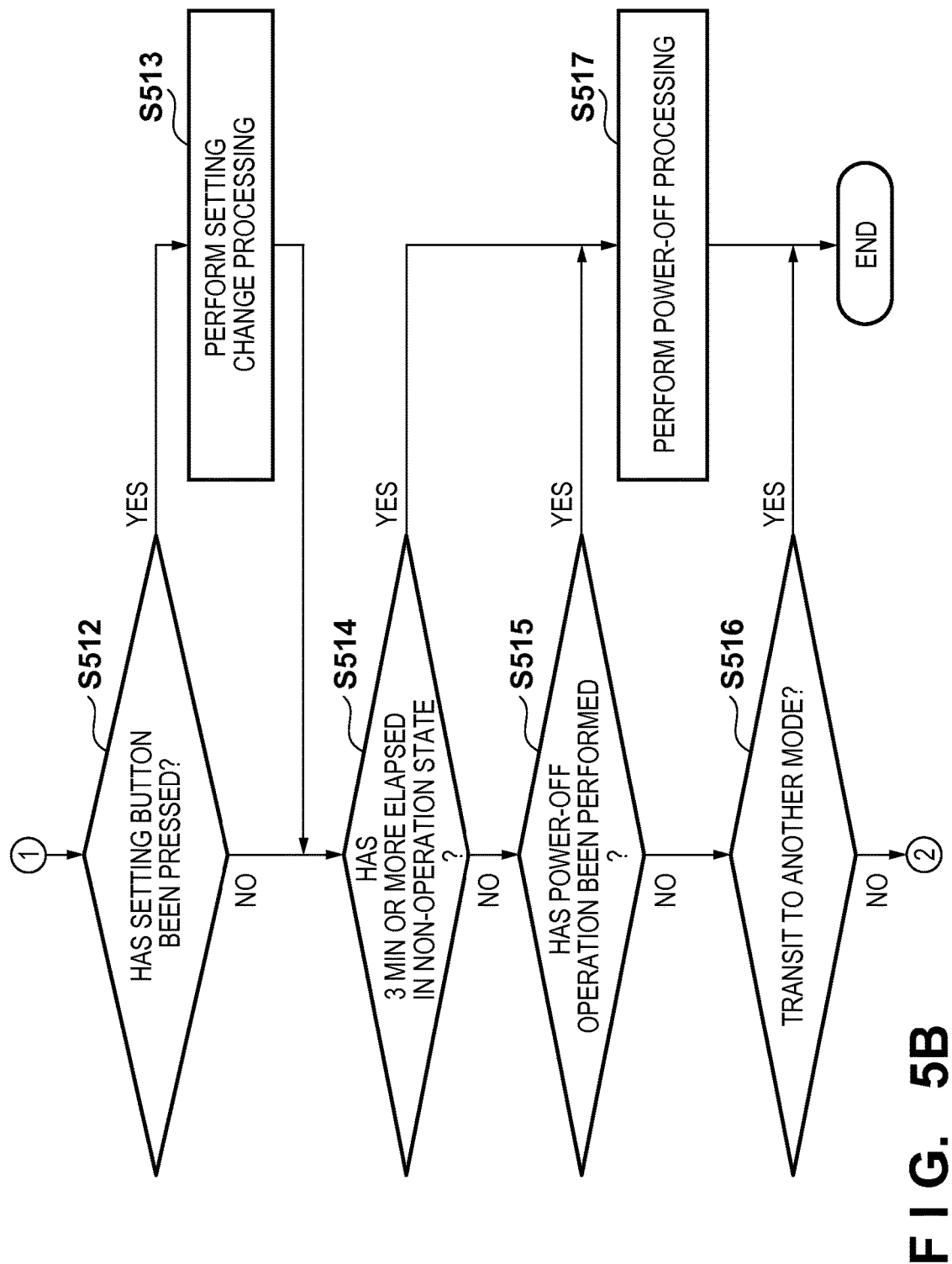

Processing of the imaging apparatus in the interval recording mode will be described next. FIGS. 5A and 5B are a flowchart illustrating interval recording mode processing. This processing is implemented by loading a program recorded in the program/data storage unit 106 using the temporary storage unit 103 as a work memory, and executing the program by the main CPU 107. When the digital video camera is activated, and set in the interval recording mode included in shooting modes, the processing shown in FIGS. 5A and 5B starts.

In step S501, the main CPU 107 issues a display instruction to the LCD panel 112, and displays a camera through image and bitmaps (the recording setting button 402 and START button 403) for OSD. In step S502, the main CPU 107 detects the attitude of the camera main body (main body unit 201) based on an output from the main body orientation detection unit 110. In step S503, the main CPU 107 determines whether the attitude detected in step S502 is the upside-down attitude. If the detected attitude is not the upside-down attitude but the normal attitude, the process advances to step S504. Alternatively, if the detected attitude is the upside-down attitude, the process advances to step S505.

In step S504, the main CPU 107 performs processing in the normal attitude. More specifically, information indicating that the normal attitude has been detected is recorded as attitude information in the temporary storage unit 103. The main CPU 107 displays OSD such as a touch button without rotation. The main CPU 107 also displays a video captured by the camera unit 101 as a through image intact without performing rotation processing. FIG. 3A shows a display example at this time.

In step S505, the main CPU 107 performs processing in the upside-down attitude. More specifically, information indicating that the upside-down attitude has been detected is recorded as attitude information in the temporary storage unit 103. If the automatic rotation function is ON, the main CPU 107 rotates OSD such as a touch button by 180°, and displays it. The video processing unit 102 rotates a video captured by the camera unit 101 by 180° for recoding in the moving image storage unit 105. Note that recording is not performed yet at this time. The video processing unit 102 further rotates, by 180°, the video rotated by 180° for displaying the video as a through image (live view image) on the LCD panel 112, and displays the rotated image as a through image on the LCD panel 112. FIG. 3C shows a display example at this time. Note that the through image is equivalent to the captured video displayed without rotation. Therefore, the video captured by the camera unit 101 may be displayed intact as a through image without performing rotation processing.

In step S506, based on information received from the sub-CPU 114 via the serial I/Fs 118 and 119, the main CPU 107 determines whether the START button 403 has been touched. If the main CPU 107 determines that the START button 403 has been touched, the process advances to step S507; otherwise, the process advances to step S509.

In step S507, the main CPU 107 starts a timer for moving image interval recording. More specifically, the main CPU 107 records a time (Tstart) when the START button 403 is touched in the temporary storage unit 103, or starts measuring the time from when the START button 403 is touched. Furthermore, the main CPU 107 reads out the recording interval of moving image interval recording recorded as a setting value from the nonvolatile memory 113. The timing of each shooting operation (the expected recording time of each recording operation) of moving image interval recording is decided according to recording interval×(shooting count−1) with respect to the time when the START button 403 is touched. If, for example, the recording interval is set to 30 sec, the respective shooting timings are decided as 0 sec after the touch operation of the START button 403 for the first shooting operation, 30 sec after the touch operation for the second shooting operation, 60 sec after the touch operation for the third shooting operation, 90 sec after the touch operation for the fourth shooting operation, and the like. In step S508, the main CPU 107 performs moving image interval recording processing. Detailed contents of the moving image interval recording processing will be described later with reference to FIGS. 6A and 6B.

In step S509, based on the information received from the sub-CPU 114 via the serial I/Fs 118 and 119, the main CPU 107 determines whether the shutter button 202 has been pressed. If the main CPU 107 determines that the shutter button 202 has been pressed, the process advances to step S510; otherwise, the process advances to step S512. In step S510, the main CPU 107 starts a timer for still image interval shooting, similarly to step S507. In step S511, the main CPU 107 performs still image interval recording processing.

In step S512, based on the information received from the sub-CPU 114 via the serial I/Fs 118 and 119, the main CPU 107 determines whether the recording setting button 402 has been touched. If the main CPU 107 determines that the recording setting button 402 has been touched, the process advances to step S513; otherwise, the process advances to step S514. In step S513, the main CPU 107 displays the recording setting screen described with reference to FIG. 4B on the LCD panel 112. When a touch of any one of the options displayed on the recording setting screen is received, and any one of the options is touched, the recording interval of the touched option is recorded as a setting value in the nonvolatile memory 113.

In step S514, the main CPU 107 determines whether 3 min or more has elapsed in a non-operation state in which no operation has been performed on the touch panel 109 or other operation keys 108. If the main CPU 107 determines that 3 min or more has elapsed in the non-operation state, the process advances to step S517 to automatically power off the apparatus for the purpose of power saving (auto power off). If the main CPU 107 determines that less than 3 min has elapsed, the process advances to step S515. Note that 3 min set as the time for determining the non-operation state is merely an example, and the present invention is not limited to this as long as the time is predetermined.

In step S515, the main CPU 107 determines whether a power-off operation has been performed. In this embodiment, assume that an operation of moving and closing the lens cover slide switch 203 corresponds to the power-off operation. If, therefore, an operation of closing the lens cover slide switch 203 has been performed, the process advances to step S517; otherwise, the process advances to step S516.

In step S516, the main CPU 107 determines whether an instruction of transiting to a mode other than the interval recording mode is issued. If the main CPU 107 determines that an instruction of transiting to a mode other than the interval recording mode is issued, the process ends without turning off the power; otherwise, the process advances to step S502 to repeat the processing.

In step S517, the main CPU 107 performs power-off processing. More specifically, the main CPU 107 notifies the sub-CPU 114 of a power-off request via the serial I/Fs 118 and 119. Upon receiving the power-off request, the sub-CPU 114 executes power-off processing. With this power-off processing, supply of power from the power supply management unit 115 to the main CPU 107 stops, thereby terminating the moving image interval recording mode processing. Note that the sub-CPU 114 stores a battery, and is always active as long as the capacity of the battery remains irrespective of ON/OFF the power supply of the main CPU 107. Assume that the sub-CPU 114 requires only a small power, as compared with power for driving the main CPU 107.

Figure 6A:
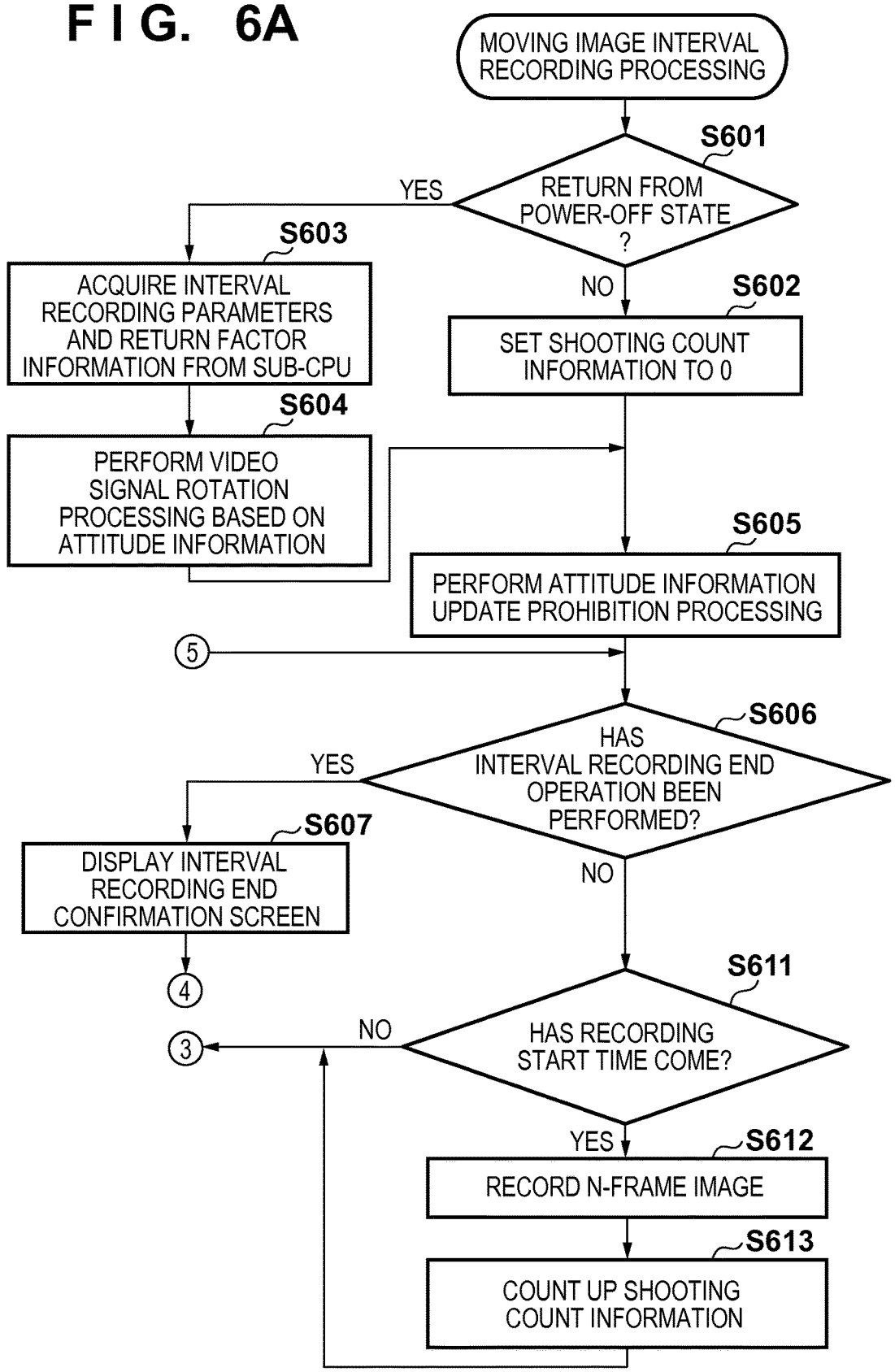
FIGS. 6A and 6B are flowcharts illustrating moving image interval recording processing.
Figure 6B:
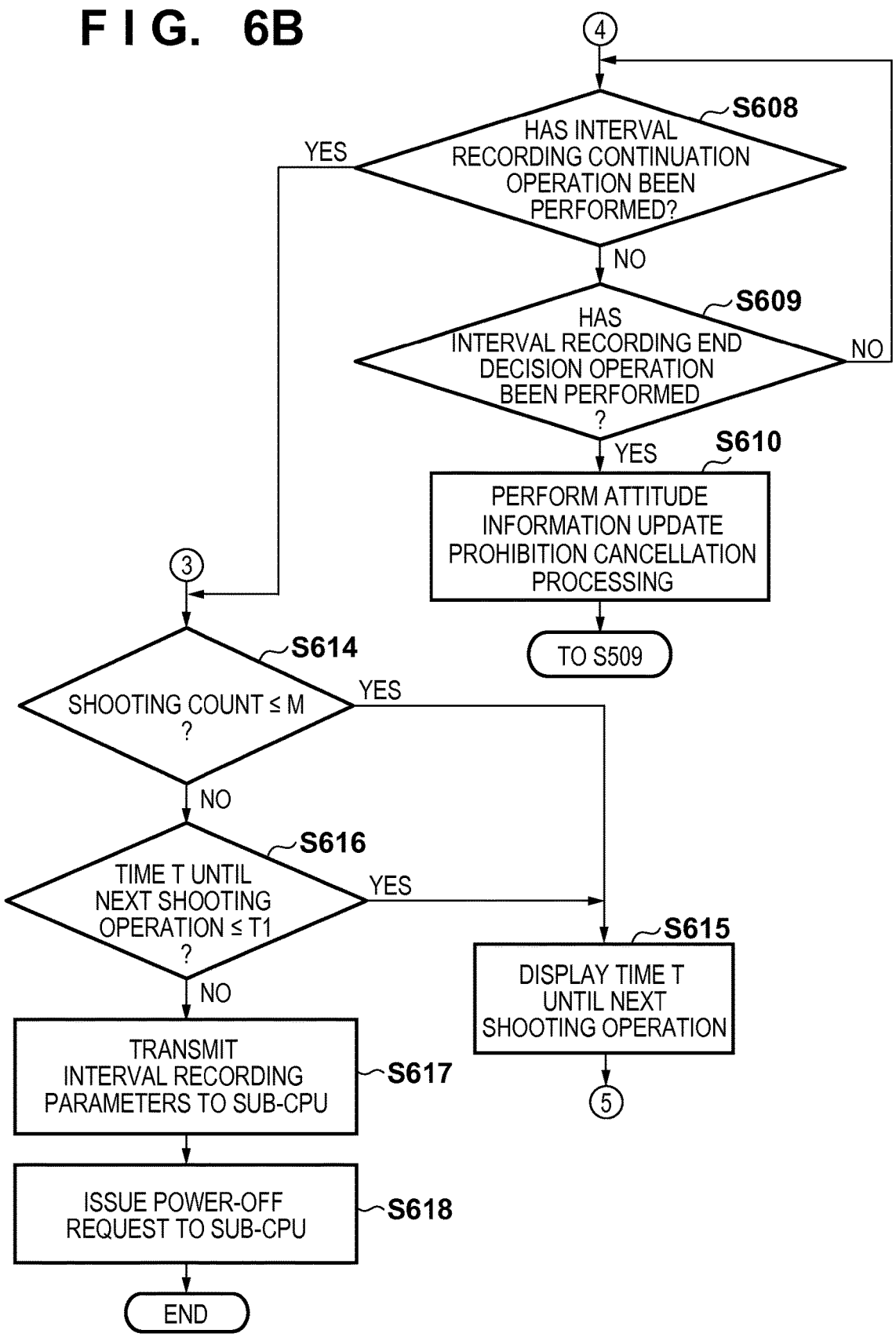

FIGS. 6A and 6B are a flowchart illustrating moving image interval recording processing. This processing indicates details of the processing in step S508 of FIG. 5A described above. This processing is implemented by loading a program recorded in the program/data storage unit 106 into the temporary storage unit 103, and executing the program by the main CPU 107.

In step S601, the main CPU 107 determines whether it has returned from the power-off state. If the processing is executed not when returning from the power-off state but when touching the START button 403, the process advances to step S602. If the main CPU 107 has returned from the power-off state, the process advances to step S603. In step S602, the main CPU 107 sets shooting count information k indicating a shooting count until now to 0, and holds the information in the temporary storage unit 103. Although the shooting count information k is stored in the temporary storage unit 103, it is sent to the sub-CPU 114 via the serial I/Fs 118 and 119, and held in the sub-CPU 114 upon power-off of the main CPU 107.

Returning from the power-off state which is checked in step S601 includes returning from a power saving mode (to be described later). In step S603, the main CPU 107 acquires returning factor information and interval recording parameters saved from the sub-CPU 114 in step S617 (to be described alter) via the serial I/Fs 118 and 119, and records the acquired information in the temporary storage unit 103. Note that the interval recording parameters to be returned in this processing include attitude information, shooting count information, and a recording start time. The returning factor information indicates whether the power is turned on by an interval recording end operation or in response to the expiration of an activation timer. In step S604, the main CPU 107 issues a video rotation instruction to the video processing unit 102 based on the attitude information received from the sub-CPU 114, thereby rotating a video to be displayed on the LCD panel 112. This processing is the same as that in steps S503 to S505 described above. That is, if the attitude is the normal attitude, the recording video is rotated by 360° or is not rotated. Alternatively, if the attitude is the upside-down attitude, the recording video is rotated by 180°. Note that instead of rotating the video by 180°, the image may be turned left to right and upside down. Irrespective of whether the processing of rotating the image by 180° is performed or the processing of turning the image left to right and upside down is performed, the resultant images have the same orientation.

In step S605, the main CPU 107 executes attitude information update prohibition processing, thereby preventing the output of the main body orientation detection unit 110 from being acquired. Alternatively, power may be saved by stopping orientation detection by the main body orientation detection unit 110. In the subsequent processing, the attitude information held in the temporary storage unit 103 is referred to. Consequently, after the start of interval recording, an attitude when update processing is prohibited in step S605 is used instead of an attitude detected at that time. As described above, in the second and subsequent image recording operations, video rotation processing is performed based on an attitude used in the first image recording operation. The attitude information referred to at this time is information about an attitude detected immediately before the start of moving image interval recording or the attitude information transmitted by the sub-CPU 114. In either case, the information represents an attitude detected immediately before the start of the moving image interval recording (that is, immediately before the START button 403 is touched).

As described above, during moving image interval recording, processing is performed based on only the attitude at the start of the moving image interval recording (in other words, the attitude in the first shooting operation). Even if the attitude changes during the moving image interval recording, it is not reflected to the detected attitude. This makes it possible to maintain the consistency between the orientations of a series of images recorded by the interval recording. For example, even if the respective images recorded by the interval recording are combined later, it is possible to prevent the occurrence of inconsistency between the images, such as a situation in which the orientation of an image suddenly changes in the middle of the combined moving image. Furthermore, if, during the interval recording, the camera lies down or the attitude of the camera changes when the user intentionally changes the attitude, the orientation of an object in a video to be recorded changes from that at the start of the interval recording. This allows the user who views the recorded image can recognize that the attitude of the camera has changed in the middle of the interval recording. On the other hand, if the user intentionally changes the attitude of the camera in the middle of the interval recording, the image intended by the user is recorded.

In step S606, based on the information received from the sub-CPU 114 via the serial I/Fs 118 and 119, the main CPU 107 determines whether an interval recording end operation has been performed. If the main CPU 107 has just returned from the power-off state, and the returning factor information received from the sub-CPU 114 indicates an interval recording end operation, the main CPU 107 determines that an interval recording end operation has been performed. The interval recording end operation corresponds to a press of a playback button which is used to instruct to transit to a playback mode and included in the operation keys 108. An operation other than a press of the playback button is not considered as an interval recording end operation. During the interval recording, operations except for a press of the playback button and an operation of moving and closing the lens cover slide switch 203 (a power-off operation) are ignored. If the main CPU 107 determines that an interval recording end operation has been performed, the process advances to step S607; otherwise, the process advances to step S611.

In step S607, the main CPU 107 displays, on the LCD panel 112, the interval recording end confirmation screen used to confirm with the user whether to actually end the interval recording. FIG. 4C shows a display example at this time. In step S608, the main CPU 107 determines whether the button 431 corresponding to "NO" has been touched (an interval recording continuation operation has been performed). If the button 431 has been touched, the process advances to step S614; otherwise, the process advances to step S609. In step S609, the main CPU 107 determines whether the button 432 corresponding to "YES" has been touched (an interval recording end decision operation has been performed). If the button 432 has been touched, the process advances to step S610; otherwise, the process returns to step S608.

In step S610, the main CPU 107 executes attitude information update prohibition cancellation processing, and advances the process to step S509 of FIG. 5A. After the cancellation processing advances the process to step S509, every time the attitude of the camera changes, the attitude information is updated with an attitude detected by the main body orientation detection unit 110, and the processing in step S503 to S505 according to the attitude is performed.

On the other hand, if no interval recording end operation has been performed, the main CPU 107 determines in step S611 whether the next recording start time in the interval recording has come. As described above, each shooting start time is decided according to recording interval×(shooting count−1) with respect to an operation of touching the START button 403. Therefore, the (k+1)th recording start time is obtained according to recording interval×k. If the next shooting operation is the first shooting operation, the recording start time is 0 sec. If, therefore, the shooting count information k is 0, YES is determined. As for the second and subsequent shooting operations, if a timer which has started at the start of the previous shooting operation reaches the set recording interval, or an elapsed time after a touch of the START button 403 reaches the next recording start time, YES is determined. If the recording start time comes, the process advances to step S612; otherwise, the process advances to step S614.

In step S612, the main CPU 107 records an N-frame moving image corresponding to a predetermined time (for example, 0.5 sec) for each recording operation of the interval recording. The recorded N-frame moving image is stored as one moving image file in the moving image storage unit 105 for each recording operation. Note that a plurality of moving image files recorded in a series of interval recording operations (from a touch of the START button 403 until an interval recording end operation) are recorded in the same folder generated at the start of the interval recording. This makes it possible to identify a group of moving image files recorded in the same folder as those shot in a series of interval recording operations. Furthermore, if the fixed attitude information (corresponding to the attitude in the first recording operation) held in the temporary storage unit 103 indicates the upside-down attitude at this time, the image captured by the camera unit 101 is rotated by 180°, and then recorded. In step S613, the main CPU 107 counts up the shooting count information k by one.

Figure 9A:
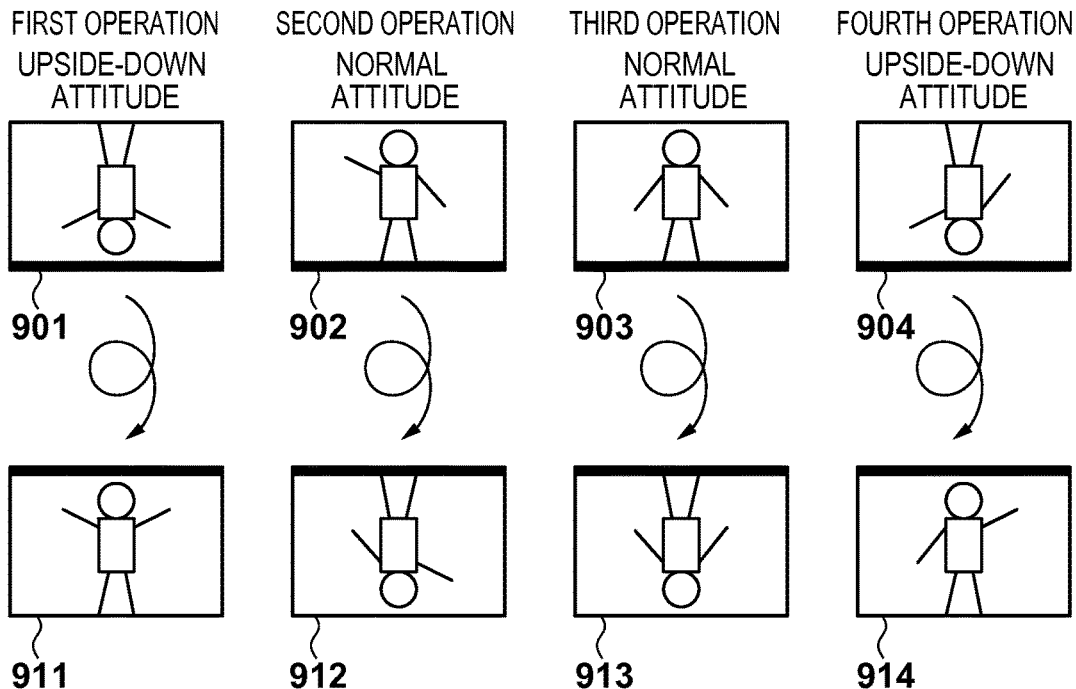
FIGS. 9A and 9B are views each for explaining rotation processing at the time of interval recording.

FIG. 9A is a view for explaining an example of interval recording according to the first embodiment. Reference numerals 901 to 904 denote moving images acquired by the image sensor. The moving images 901 and 904 are captured in the upside-down attitude. Referring to FIG. 9A, the first recording operation is performed in the upside-down attitude, and the moving image 901 is rotated by 180°, and then recorded as a moving image file 911. In this example, since the first recording operation is performed in the upside-down attitude, moving images acquired in the second and subsequent recording operations are rotated by 180° irrespective of the attitude of the imaging apparatus. Consequently, if the second recording operation is performed in the normal attitude, the moving image 902 is obtained in the image sensor, rotated by 180°, and recorded as a moving image file 912. The same applies to moving images obtained in the third and fourth recording operations. The moving images 903 and 904 are rotated by 180°, and recorded as moving image files 913 and 914. As described above, the top and bottom directions of a series of moving image files obtained by interval recording coincide with each other, and the consistency between the orientations of the images is maintained.

In step S614, the main CPU 107 accesses the temporary storage unit 103, and determines whether the shooting count information k indicating the shooting count until now is equal to or smaller than M where M is an integer of 1 or more. If the shooting count is equal to or smaller than M, the process advances to step S615 to stand by in the power-on state until the next recording start time. If the shooting count is larger than M, the process advances to step S616 to perform processing for power saving by entering the power-off state. In this embodiment, transition to the power saving state is prevented from being executed before the recording count in the interval recording exceeds a predetermined count.

The reason why power saving processing (transition to the power saving state) is not executed before the shooting count exceeds M is as follows. That is, when interval recording starts upon a touch of the START button 403, if transition to the power-off state is performed to save power immediately after the first recording operation is performed, the user cannot determine whether the interval recording is being normally executed, and may be uncertain about it. To confirm whether shooting is being performed with composition intended by the user, he/she may want to view a through image. In the processing in step S614, therefore, the through image remains displayed without saving power from the start of the interval recording until the Mth recording operation. This allows the user to confirm that the apparatus is in an interval recording state early after the start of the interval recording, thereby dispelling the user's uncertainty. If the user can confirm that shooting has been normally performed several times exceeding M, the user may leave the camera set on a tripod or floor in accordance with the characteristic of the interval recording. Even if, therefore, the display of the through image is stopped to enter the power saving state at this time, almost no problem arises.

Note that if it is considered that it is only necessary to confirm display immediately after the first recording operation, the apparatus enters the power saving state (power-off state) after the second recording operation by setting M=2, resulting in the minimum power consumption. The value of M may be set to a different value according to the recording interval in consideration of the time until the user leaves the camera. Consider, for example, that the user does not view the display of the LCD panel 112 one min after the start of the interval recording. In this case, it is only necessary to set M=6 when the recording interval is 10 sec, M=1 when the recording interval is 1 min, and M=0 when the recording interval is 10 min.

In step S614, instead of the determination processing using the recording count M, it may be determined whether a predetermined time (for example, 1 min) has elapsed after the start of the interval recording upon a touch of the START button 403. In this case, if the predetermined time has not elapsed, the process advances to step S615; otherwise, the process advances to step S616. This allows the user to confirm some operation display such as a through image and the time until the next shooting operation from the start of the interval recording until the user, for example, leaves the camera and thus does not view the display, irrespective of setting of the recording interval. Note that the process may always advance to step S616 by omitting the processing in step S614, and transition to the power saving state may be performed immediately after the first recording operation.

In step S615, the main CPU 107 displays the time until the next shooting (recording) operation on the LCD panel 112. This allows the user to know that the interval recording is in progress, and how many seconds until the start of recording. Instead of or in addition to the time until the next shooting operation, at least one of pieces of information such as a through image, the shooting count (k) until now, and an elapsed time after the start of the interval recording may be displayed. Note that the processing in step S615 may be omitted to display nothing.

The main CPU 107 controls the imaging apparatus to transit to the power saving state when the time until the next recording operation of the interval recording exceeds a predetermined time, and controls the imaging apparatus not to transit to the power saving state when the time until the next recording operation is equal to or shorter than the predetermined time. More specifically, in step S616, the main CPU 107 determines whether a time T until the next shooting operation is equal to or shorter than a predetermined time T1. The time T until the next shooting operation is obtained according to:

$$T = \{\text{recording interval} \times (k+1)\} - (\text{elapsed time of timer which has started in step } S507)$$

If the recording interval of the interval recording is set to a value equal to or smaller than T1, YES is always determined in step S616, and thus the power saving processing in step S617 is not executed. If the recording interval is set to a value larger than T1, determination changes depending on the timing when it is determined in step S608 that an interval recording continuation operation has been performed. If it is determined that the time T until the next shooting operation is equal to or shorter than the predetermined time T1, the process advances to step S615; otherwise, the process advances to step S617.

The reason why the power saving processing is executed only if the time until the next shooting operation is longer than the predetermined time T1 is as follows. When performing power saving control, the time until a power-off request is transmitted to the sub-CPU 114 and the main CPU 107 is powered off to enter the power saving state, and the time until the main CPU 107 returns from the power saving state to enter a recording enable state are required. If, therefore, it is controlled to perform transition to the power saving state when the time T until the next shooting operation is short, there may be no time to return from the power saving state to enter the recording enable state before the timing when recording needs to start. It may be impossible to perform recording at the timing when recording needs to start, and shooting may be performed at a timing shifted (delayed) from the recording interval set by the user. To avoid such situation, the power saving processing is executed only if the time until the next shooting operation is longer than the predetermined time T1. This makes it possible to faithfully perform shooting according to the setting of the recording interval designated by the user. On the other hand, if the time until the next shooting operation starts is long, it is possible to suppress the consumption of the buttery by immediately powering off the main CPU 107.

The temporary storage unit 103 storing the parameters for the interval recording cannot maintain the stored contents in the power saving state. Before causing the imaging apparatus to transit to the power saving state, in step S617 the main CPU 107 saves the parameters for the interval recording held in the temporary storage unit 103 in a memory which can maintain stored contents in the power saving state. That is, the main CPU 107 transmits, to the sub-CPU 114 via the serial I/Fs 118 and 119, the parameters such as attitude information, shooting count information, and the time Tstart when the START button 403 is touched. The sub-CPU 114 stores the received recording parameters in a temporary storage unit 117. The temporary storage unit 117 can maintain the parameters even in the power saving state since power supply is maintained even in the power saving state. This makes it possible to acquire the attitude information, the shooting count information, and the time Tstart again at the next returning timing even if the main CPU 107 is powered off to clear the contents of the temporary storage unit 103 as a volatile memory. Note that in this embodiment, the attitude information, the shooting count information, and the time Tstart are transmitted to the sub-CPU 114, and recorded in the temporary storage unit 117. Instead, the parameters may be recorded in the nonvolatile memory 113. In this case, the main CPU 107 acquires the attitude information, the shooting count information, and the time Tstart from the nonvolatile memory 113 at the time of returning from the power saving state (step S603). Note that in this embodiment, the parameters are stored in the nonvolatile memory 113 by considering that the recording interval of the interval recording does not change so frequently. Therefore, the parameters saved when transiting to the power saving state do not include the recording interval. However, the recording interval may be stored in the temporary storage unit 103, and may undergo the aforementioned saving processing, as a matter of course.

In step S618, the main CPU 107 issues a power-off request to the sub-CPU 114 via the serial I/Fs 118 and 119. Upon issuance of the power-off request, processing of the sub-CPU 114 causes the main CPU 107 to enter the power-off state (power saving state), thereby terminating the process shown in FIGS. 6A and 6B. Note that the still image interval recording processing in step S505 of FIG. 5A is the same as the moving image interval recording processing of FIGS. 6A and 6B except that a recording target is not a moving image but a still image. That is, in the still image interval recording processing, the processing in step S612 of the moving image interval recording processing of FIGS. 6A and 6B is changed to still image recording processing, thereby generating one still image file for each still image.

Figure 7:
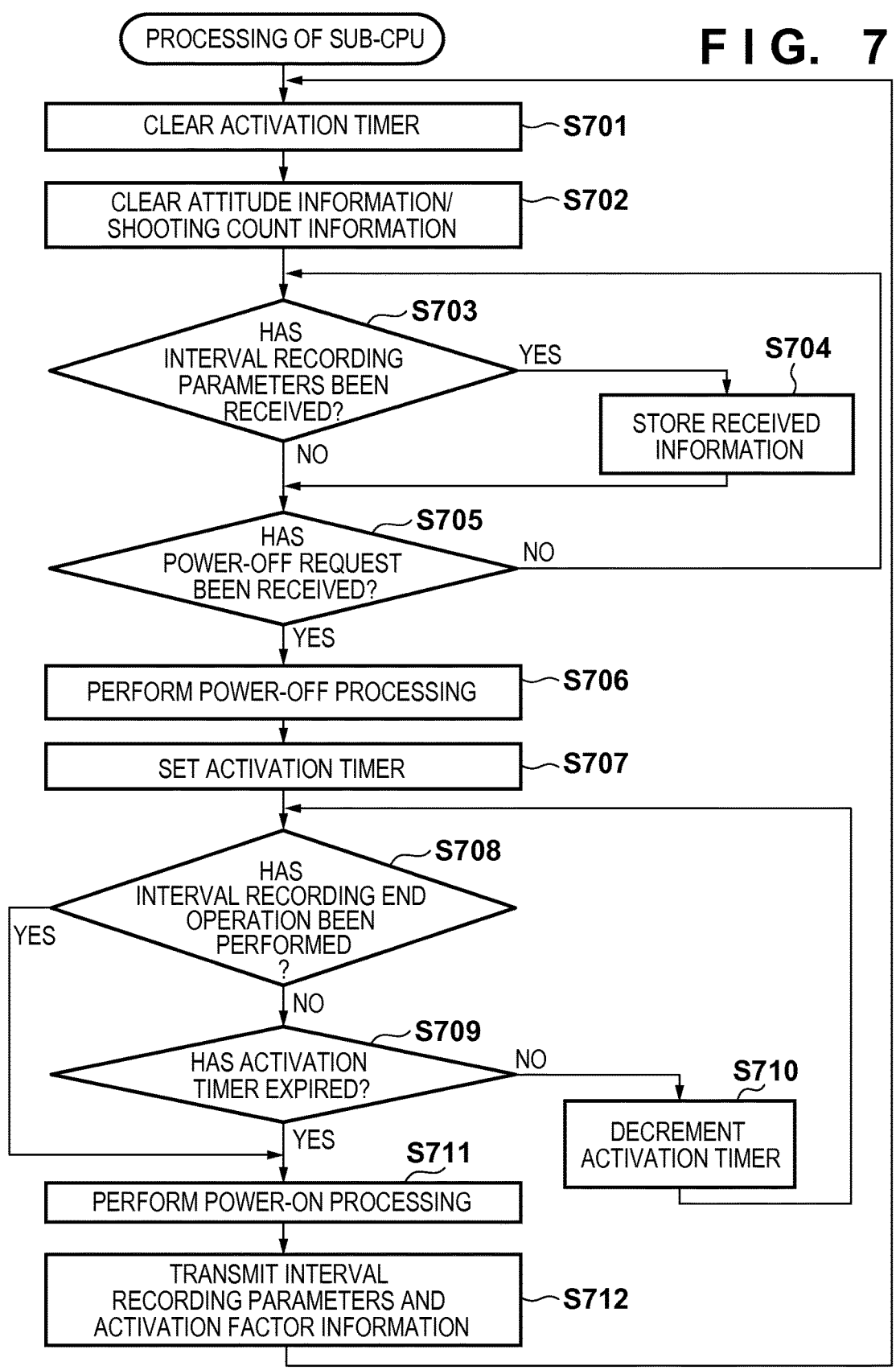
FIG. 7 is a flowchart illustrating processing by a sub-CPU.

The operation of the sub-CPU 114 in the moving image interval recording processing of the imaging apparatus will be described. FIG. 7 is a flowchart illustrating the control of the sub-CPU 114 in the moving image interval recording processing. This processing is implemented by loading a program stored in the program/data storage unit 116 into the temporary storage unit 117, and executing the program by the sub-CPU 114.

In step S701, the sub-CPU 114 clears an internally managed activation timer. In step S702, the sub-CPU 114 performs processing of clearing attitude information/shooting count information managed in the temporary storage unit 117. In step S703, the sub-CPU 114 determines whether it has received the attitude information, the shooting count information, the time Tstart when the START button 403 is touched, and the recording interval from the main CPU 107 via the serial I/Fs 118 and 119. It is determined in step S703 whether the sub-CPU 114 has received various kinds of information transmitted from the main CPU 107 in step S617 of FIG. 6B described above. If the sub-CPU 114 determines that it has received the attitude information, the shooting count information, the time Tstart when the START button 403 is touched, and the recording interval, the process advances to step S704; otherwise, the process advances to step S705.

In step S704, the sub-CPU 114 records, in the temporary storage unit 117, the attitude information, the shooting count information k, the time Tstart when the START button 403 is touched, and the recording interval, which have been received from the main CPU 107. In step S705, the sub-CPU 114 determines whether it has received a power-off request from the main CPU 107 via the serial I/Fs 118 and 119. It is determined in step S705 whether the power-off request transmitted from the main CPU 107 in step S618 of FIG. 6B described above has been received. If the sub-CPU 114 determines that it has received the power-off request, the process advances to step S706; otherwise the process returns to step S703.

In step S706, the sub-CPU 114 instructs the power supply management unit 115 to shut down the main CPU 107, thereby powering off the main CPU 107. In step S707, the sub-CPU 114 sets the activation timer until next activation. The activation timer is set to a time a predetermined time T2 (for example, 5 sec) shorter than the time until the next recording start time. For example, the next recording start time is obtained according to:

$T\text{start}+\{\text{recording interval}\times(k+1)\}$

Therefore, the activation timer is decided according to:

activation timer=$T\text{start}+\{\text{recording interval}\times(k+1)\}-$ current time$-T2$ In step S708, the sub-CPU 114 determines whether an interval recording end operation has been performed. If an end operation has been performed, the process advances to step S711; otherwise, the process advances to step S709. In step S709, the sub-CPU 114 determines whether the activation timer set in step S707 has expired (the time for the activation timer has elapsed). If the sub-CPU 114 determines that the activation timer has expired, the process advances to step S711; otherwise, the process advances to step S710.

In step S710, the sub-CPU 114 performs processing of decrementing the activation timer. In step S711, the sub-CPU 114 instructs the power supply management unit 115 to power on the main CPU 107, thereby powering on the main CPU 107. In step S712, the sub-CPU 114 transmits the attitude information, the shooting count information k, the time Tstart, the recording interval, and activation factor information to the main CPU 107 via the serial I/Fs 118 and 119. Note that the activation factor information indicates whether the power is turned on by an interval recording end operation or in response to the expiration of the activation timer.

As described above, according to this embodiment, in the moving image interval recording processing and the still image interval recording processing, it is possible to refer to the same attitude information during recording in the interval recording mode. This can implement combining processing intended by the user when combining a moving image scene shot later in the interval recording.

Note that in the above-described embodiment, a case has been described in which an attitude detected immediately before a trigger (a touch of the START button 403 for moving image interval recording) of starting interval recording of a moving image or still image is held as attitude information. However, the timing when an attitude to be held is detected is not limited to this, and it is only necessary to detect an attitude for an image recorded in the first operation of the interval recording, and refer to the same attitude information as that of the image recorded in the first operation for images recorded in the second and subsequent operations. For example, an attitude detected immediately after a trigger of starting interval recording or an attitude detected immediately before or after or in the middle of shooting of the image recorded in the first operation may be maintained as attitude information.

Note that a case in which an image is rotated by 180° when the camera is in the upside-down attitude has been explained in the above-described embodiment. The present invention is not limited to this, and rotation processing may be performed when the camera is in an attitude other than the normal attitude. When, for example, it is detected that shooting is being performed while the camera is in the portrait attitude tilted by about 90° with respect to the normal attitude, an image to be recorded may be rotated by 90° in a direction opposite to the tilt direction of the camera, and then recorded. In this case, processing is performed in accordance with the attitude of the image recorded in the first operation.

In the above-described embodiment, N frames are rotated and recorded in accordance with the fixed attitude information in step S612. The present invention, however, is not limited to this. In step S612, for example, the main CPU 107 may add attribute information to an image in accordance with the fixed attitude information without rotating the image at the time of recording the image. For example, an attitude flag (rotation flag) indicating rotation of an image can be used as attribute information. This makes it possible to automatically rotate and display or integrate image files by referring to the attitude flags at the time of playback or integration of the image files, as will be described in the second embodiment. In interval shooting, for example, attribute information "180°" is added if the upside-down attitude has been detected in the first shooting operation. If "180°" is added in the first shooting operation, an attitude flag of "180°" is added to images in the second and subsequent shooting operations, irrespective of the current attitude.

Second Embodiment

In the above-described first embodiment, if the attitude information (the attitude at the time of the first recording operation) held in the temporary storage unit 103 indicates the upside-down attitude, an image captured by the camera unit 101 is rotated by 180°, and then recorded. However, the image file may be associated with the attribute information indicating the attitude information (the attitude at the time of the first recording operation) held in the temporary storage unit 103, and recorded without performing the above rotation processing at the time of recording. For example, instead of the arrangement of the first embodiment in which if the first recording operation is performed in the upside-down attitude, rotation processing according to the upside-down attitude is performed to record images at the time of the second and subsequent image recording operations, each image may be added with an attribute indicating the attitude at the time of each recording operation without executing rotation processing, and then recorded. If such attribute addition processing is performed without executing rotation processing, attribute information added to each image is referred to, and all images obtained in a series of interval recording operations undergo rotation processing to comply with the attitude of the image recorded in the first operation in subsequent combining processing. For example, when combining a plurality of moving images obtained in a series of interval recording operations, the attribute information is referred to. If the image recorded in the first operation indicates the upside-down attitude, all the moving images to be combined are rotated by 180° (this operation is equivalent to processing of turning the images upside down and left to right), and then combined.

In the second embodiment, an arrangement will be explained in which when combining moving image files obtained in interval recording as described above, videos are rotated and combined based on the attitude information of the first file. Note that the arrangement and outer appearance of a video camera main body and a display mode on an LCD panel according to the second embodiment are the same as those in the first embodiment (FIGS. 1, 2A to 2C, and 3A to 3C).

Figure 8:
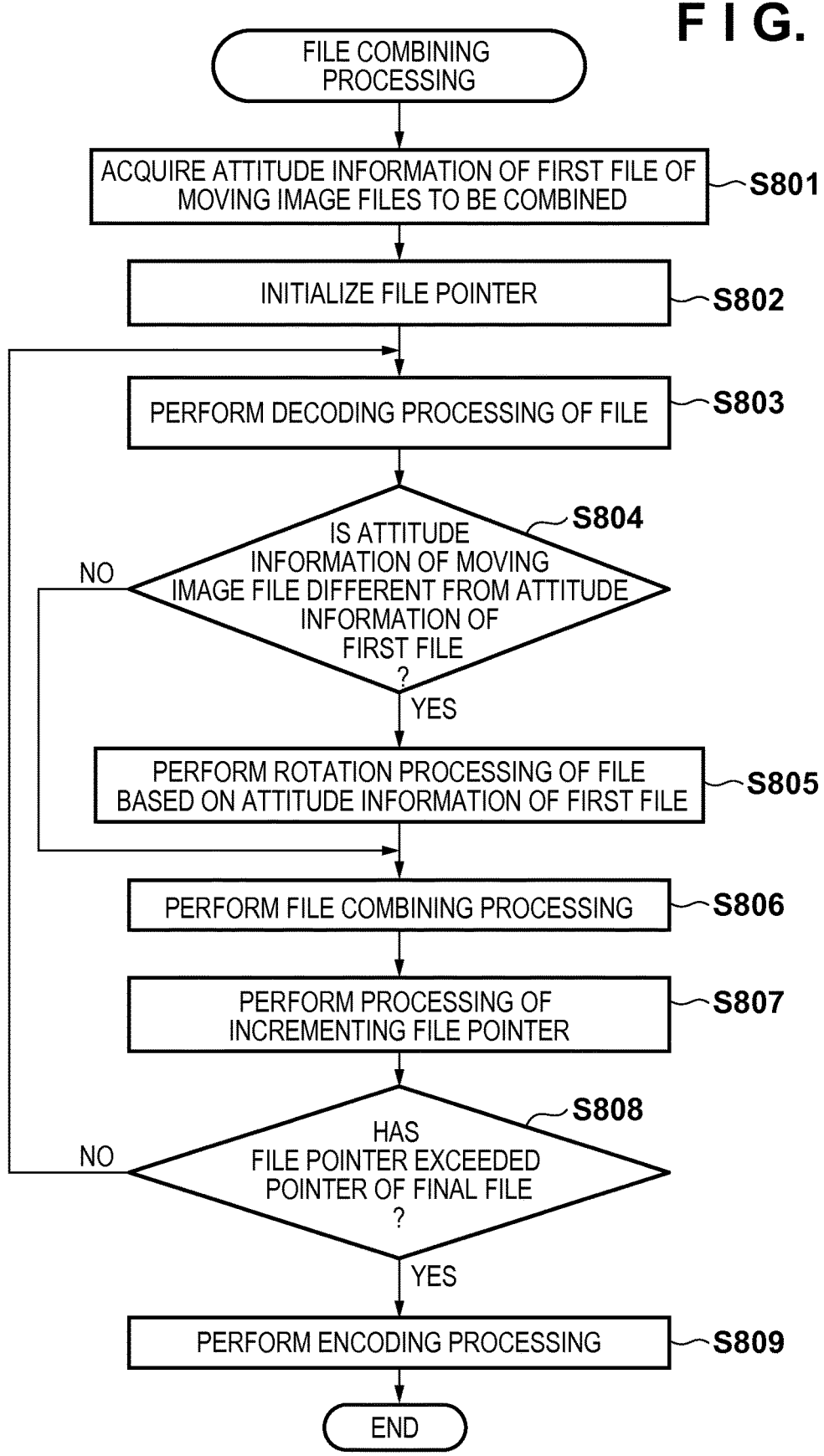
FIG. 8 is a flowchart illustrating file integration processing according to the second embodiment.

FIG. 8 is a flowchart illustrating the control of rotating and combining video signals based on the attitude information of the first file in moving image file combining processing executed after the end of interval recording. In step S801, a main CPU 107 acquires attribute information associated with the first file of a group of moving image files to be combined. As the group of moving image files to be combined, the user can designate one folder to set all moving image files included in the designated folder as combining targets. If images recorded in a series of interval recording operations are stored in the same folder as in the first embodiment, it is possible to set a plurality of moving images recorded in a series of interval recording operations as combining targets by designating one folder. The first file indicates, for example, a file having a smallest file number among the moving image files included in the designated folder (a file having a smallest number included in a file name).

Note that the method of designating files to be combined is not limited to this, and a file group may be formed by allowing the user to arbitrarily designate files to be combined including arbitrary moving image files or still images. Furthermore, the attitude information may be managed as metadata in a management file different from the image file, or may be recorded in the header of the image file. Upon completion of acquisition of the attitude information associated with the first file, the process advances to step S802.

In step S802, the main CPU 107 initializes a file pointer managed by an internal variable by a pointer to the first file. The file pointer is managed as the identifier of each file, and used for open/close of the file, load processing, write processing, decoding processing, or encoding processing. Upon initialization of the file pointer by the pointer of the first file, the process advances to step S803.

In step S803, the main CPU 107 instructs an encoder/decoder unit 104 to decode a file indicated by the file pointer for combining the file, thereby performing decoding processing. Upon completion of the decoding processing, the process advances to step S804. In step S804, the main CPU 107 determines whether attitude information associated with the decoded file is different from the attitude information of the first file acquired in step S801. If the pieces of information are different from each other, the process advances to step S805; otherwise, the process advances to step S806.

In step S805, the main CPU 107 issues a video rotation instruction to a video processing unit 102 to set a rotating state in which a video is captured in the attitude indicated by the attitude information of the first file acquired in step S801, thereby rotating a video. Upon completion of rotation of the video, the process advances to step S806. In step S806, the main CPU 107 issues a file combining instruction to the video processing unit 102, thereby combining files. Upon completion of combining of the files, the process advances to step S807.

In step S807, the main CPU 107 performs processing of incrementing the internally managed file pointer to set the next file to be combined. Upon completion of the processing of incrementing the file pointer, the process advances to step S808. In step S808, the main CPU 107 determines whether the file pointer incremented in step S807 has exceeded the pointer of a final file. If the pointer of the final file has been exceeded, the combining processing is completed. If the main CPU 107 determines that the file pointer has not exceeded the pointer of the final file, the process returns to step S803 to repeat the above-described processing.

If the main CPU 107 determines in step S808 that the file pointer incremented in step S807 has exceeded the pointer of the final file, the process advances to step S809. In step S809, the main CPU 107 issues an encoding instruction to the encoder/decoder unit 104 to encode the combined files, thereby performing encoding processing. Upon completion of the encoding processing, the process ends.

Figure 9B:
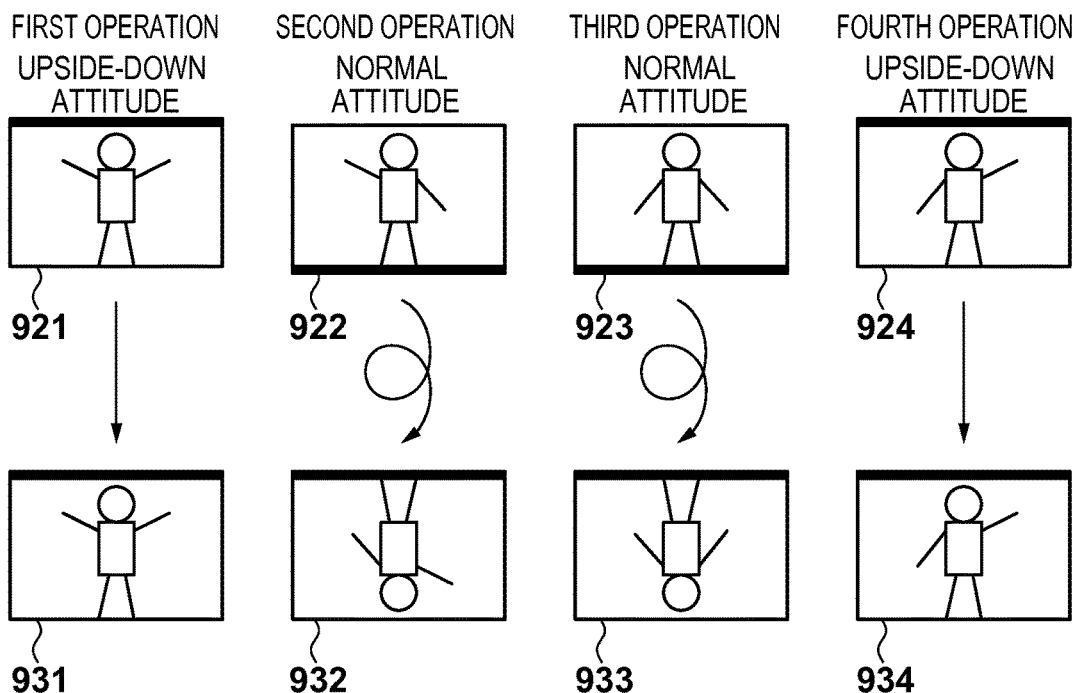

As described above, since the attitude information of a subsequent file is converted based on the attitude information of the first file in combining moving image files, combined scenes have the same attitude information, thereby implementing combining processing intended by the user. When, for example, integrating moving image files 921 to 924 obtained by four moving image recording operations as shown in FIG. 9B, the attitude information of the first moving image file 921 indicates the "upside-down attitude". Referring to FIG. 9B, a side indicated by the thick line of an image frame corresponds to the bottom side of the imaging apparatus. The moving image of the moving image file 921 is rotated by 180° by the automatic rotation function (rotated so that the thick line indicating the bottom side of the imaging apparatus is set on the upper side), and thus an object is in an erect state. When performing combining processing by setting the moving image file 921 as a first moving image file 931, the attitude information of the next moving image file 922 indicates the normal attitude, and is different from that of the first moving image file 921. Therefore, rotation processing is performed so that the top and bottom states of the image change from the state of the "normal attitude" to the state of the "upside-down attitude" to obtain a second moving image file 932, which is then combined with the moving image file 931. Similarly, as for the third moving image file 923, a moving image file 933 obtained by rotating the third moving image file 923 by 180° is combined. Since the attitude information of the moving image file 924 is the same as that of the first moving image file 921, combining processing is performed in the state of a moving image file 934 which has undergone no rotation processing. Upon completion of combining of the series of moving image files obtained by the interval recording, the top and bottom directions of all the combined moving image files coincide with each other, thereby maintaining the consistency between the orientations of the images.

Note that the above-described main CPU 107 or a sub-CPU 114 may be controlled by one hardware component, or a plurality of hardware components may share processing to control the overall apparatus.

The present invention has been described in detail based on the preferred embodiments but is not limited to the specific embodiments. The present invention includes various modes without departing from the spirit and scope thereof. Each of the above-described embodiments is merely an embodiment of the present invention, and the respective embodiments can be combined, as needed.

Furthermore, in the above-described embodiments, a case in which the present invention is applied to a video camera has been exemplified. The present invention is not limited to this, and is applicable to any electronic apparatus having an imaging apparatus capable of performing interval recording. That is, the present invention is applicable to a personal computer, PDA, mobile phone terminal, portable image viewer, music player, game machine, and the like each having the camera function.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-158272, filed Jul. 30, 2013, which is hereby incorporated by reference herein in its entirety.

What is claimed is:

1. An electronic apparatus including an imaging unit, comprising:
    an attitude detection unit configured to detect an attitude of the electronic apparatus;
    a processing unit configured to perform specific processing for an image captured by the imaging unit based on the attitude detected by the attitude detection unit;

a recording control unit configured to perform interval recording in which an image captured by the imaging unit is recorded at an interval based on predetermined setting interval;

a control unit configured to control the processing unit to perform, for images recorded in a second image recording operation and subsequent image recording operations of the interval recording, the specific processing based on information of an attitude used to perform a first image recording operation at the time of the interval recording; and a holding unit configured to hold a parameter to be used in the interval recording in a first memory, wherein:
  the interval recording is executed using the parameter held in the first memory,
  the parameter includes the attitude detected by the attitude detection unit in the first image recording operation of the interval recording, and
  the processing unit executes the specific processing using the attitude held in the first memory in each of the second image recording operation and subsequent image recording operations of the interval recording.

2. The apparatus according to claim 1, further comprising
a receiving unit configured to receive a start instruction of the interval recording from a user,
wherein the recording control unit controls to perform a plurality of image recording operations at the interval in response to the start instruction received by the receiving unit, and
wherein the first image recording operation indicates a first operation of the plurality of image recording operations in response to the start instruction.

3. The apparatus according to claim 1, wherein the setting interval is not shorter than 5 sec.

4. The apparatus according to claim 1, wherein the setting interval is set by selecting one of a plurality of options by a user.

5. The apparatus according to claim 1, wherein the attitude used to perform the first image recording operation is an attitude detected by the attitude detection unit immediately before a start instruction of the interval recording.

6. The apparatus according to claim 1, wherein the specific processing is rotation processing of rotating an image captured based on the detected attitude.

7. The apparatus according to claim 6, wherein when the detected attitude indicates an upside-down attitude of the electronic apparatus, and the rotation processing rotates the image captured by the imaging unit by 180°.

8. The apparatus according to claim 1, wherein the specific processing is processing of adding attribute information to an image captured based on the detected attitude.

9. The apparatus according to claim 1, wherein in the interval recording, one moving image file is recorded for each image recording operation.

10. The apparatus according to claim 1, wherein in the interval recording, one still image file is recorded for each image recording operation.

11. The apparatus according to claim 9, wherein a plurality of files recorded in a series of interval recording operations are recorded in one folder.

12. The apparatus according to claim 1, wherein the parameter includes least one of a current shooting count in the interval recording, a start time of the interval recording, and the setting interval.

13. The apparatus according to claim 1, further comprising
a power saving unit configured to cause the electronic apparatus to transit to a power saving state during recording in the interval recording,
wherein during the power saving state, the holding unit saves, in a second memory capable of maintaining a stored content in the power saving state, the parameter recorded in the first memory which is not capable of maintaining a stored content in the power saving state.

14. The apparatus according to claim 13, wherein the second memory maintains recording by receiving power supply in the power saving state.

15. The apparatus according to claim 13, wherein the second memory is a nonvolatile memory configured to maintain recording even if no power is supplied.

16. The apparatus according to claim 13, wherein when a time until a next recording operation of the interval recording exceeds a predetermined time, the power saving unit causes the electronic apparatus to transit to the power saving state, and when the time until the next recording opera on does not exceed the predetermined time, the power saving unit does not cause the electronic apparatus to transit to the power saving state.

17. The apparatus according to claim 13, wherein the power saving unit executes no transition to the power saving state before a recording count in the interval recording exceeds a predetermined count.

18. The apparatus according to claim 13, wherein the power saying unit executes no transition to the power saving state before a time after start of the interval recording exceeds a predetermined time.

19. A control method for an electronic apparatus including an imaging unit, comprising:
  detecting an attitude of the electronic apparatus;
  performing specific processing for an image captured by the imaging unit based on the detected attitude;
  performing interval recording in which an image captured by the imaging unit is recorded at an interval based on a predetermined setting interval;
  controlling to perform, for images recorded in a second image recording operation and subsequent image recording operations of the interval recording, the specific processing based on information of an attitude used to perform a first image recording operation at the time of the interval recording; and
  holding a parameter to be used in the interval recording in a first memory,
wherein:
  the interval recording is executed using the parameter held in the first memory,
  the parameter includes the attitude detected by the attitude detection unit in the first image recording operation of the interval recording, and
  the processing unit executes the specific processing using the attitude held in the first memory in each of the second image recording operation and subsequent image recording operations of the interval recording.

20. A non-transitory computer-readable storage medium storing a program for causing a computer of an electronic apparatus including an imaging unit to function as:
  an attitude detection unit configured to detect an attitude of the electronic apparatus;
  a processing unit configured to perform specific processing for an image captured by the imaging unit based on the attitude detected by the attitude detection unit;

a recording control unit configured to perform interval recording in which an image captured by the imagine unit is recorded at an interval based on a predetermined setting interval;

a control unit configured to control the processing unit to perform for images recorded in a second image recording operation and subsequent image recording operations of the interval recording, the specific processing based on information of an attitude used to perform a first image recording operation at the time of the interval recording; and a holding unit configured to hold a parameter to be used in the interval recording in a first memory, wherein:
the interval recording is executed using the parameter held in the first memory,
the parameter includes the attitude detected by the attitude detection unit in the first image recording operation of the interval recording, and
the processing unit executes the specific processing using the attitude held in the first memory in each of the second image recording operation and subsequent image recording operations of the interval recording.

21. An electronic apparatus including an imaging unit; comprising:

an attitude detection unit configured to detect an attitude of the electronic apparatus;

a processing unit configured to perform specific processing for an image captured by the imaging unit based on the attitude detected by the attitude detection unit;

a recording control unit configured to perform interval recording in which an image captured by the imaging unit is recorded at an interval based on a predetermined setting interval;

a control unit configured to control the processing unit to perform, for images recorded in a second operation and subsequent operations, the specific processing based on information of an attitude used to perform a first image recording operation at the time of the interval recording;

a holding unit configured to hold a parameter to be used in the interval recording in a first memory; and a power saving unit configured to cause the electronic apparatus to transit a power saving state during recording in the interval recording, wherein the interval recording is executed using the parameter held in the first memory, and wherein during the power saving state, the holding unit saves, in a second memory capable of maintaining a stored content in the power saving state, the parameter recorded in the first memory which is not capable of maintaining a stored content in the power saving state.

22. The apparatus according to claim 21, wherein the second memory maintains recording by receiving power supply in the power saving state.

23. The apparatus according to claim 21, wherein the second memory is a nonvolatile memory configured to maintain recording even if no power is supplied.

24. The apparatus according to claim 21, wherein when a time until a next recording operation of the interval recording exceeds a predetermined time, the power saving unit causes the electronic apparatus to transit to the power saving state, and when the time until the next recording operation does not exceed the predetermined time, the power saving unit does not cause the electronic apparatus to transit to the power saving state.

25. The apparatus according to claim 21, wherein the power saving unit executes no transition to the power saving state before a recording count in the interval recording exceeds a predetermined count.

26. The apparatus according to claim 21, wherein the power saving unit executes no transition to the power saving state before a time after start of the interval recording exceeds a predetermined time.

27. A control method for an electronic apparatus including an imaging unit, comprising:

detecting an attitude of the electronic apparatus;

performing specific processing for an image captured by the imaging unit based on the detected attitude;

performing interval recording in which an image captured by the imaging unit is recorded at an interval based on a predetermined setting interval;

controlling to perform, for images recorded in a second image recording operation and subsequent image recording operations of the interval recording, the specific processing based on information of an attitude used to perform a first image recording operation at the time of the interval recording;

holding a parameter to be used in the interval recording in a first memory; and causing the electronic apparatus to transit to a power saving state during recording in the interval recording, wherein the interval recording is executed using the parameter held in the first memory, and wherein during the power saving state, the parameter recorded in the first memory which is not capable of maintaining a stored content in the power saving state, is saved in a second memory capable of maintaining a stored content in the power saving state.

28. A non-transitory computer-readable storage medium storing a program for causing a computer of an electronic apparatus including an imaging unit to function as:

an attitude detection unit configured to detect an attitude of the electronic apparatus;

a processing unit configured to perform specific processing for an image captured by the imaging unit based on the attitude detected by the attitude detection unit;

a recording control unit configured to perform interval recording in which an image captured by the imaging unit is recorded at an interval based on a predetermined setting interval;

a control unit configured to control the processing unit to perform, for images recorded in a second operation and subsequent operations, the specific processing based on information of an attitude used to perform a first image recording operation at the time of the interval recording;

a holding unit configured to hold a parameter to be used in the interval recording in a first memory; and a power saving unit configured to cause the electronic apparatus to transit to a power saving state during recording in the interval recording, wherein the interval recording is executed using the parameter held in the first memory, and wherein during the power saving state, the holding unit saves, in a second memory capable of maintaining a stored content in the power saving state, the parameter recorded in the first memory which is not capable of maintaining a stored content in the power saving state.

* * * * *